United States Patent [19]
Koike

[11] Patent Number: 4,786,882
[45] Date of Patent: Nov. 22, 1988

[54] QUADRIPHASE PHASE MODULATION SYSTEM

[75] Inventor: Shin'Ichi Koike, Tokyo, Japan

[73] Assignee: NEC Corporation, Tokyo, Japan

[21] Appl. No.: 923,470

[22] Filed: Oct. 27, 1986

[30] Foreign Application Priority Data

Oct. 26, 1985 [JP] Japan .................................. 60-238605

[51] Int. Cl.$^4$ ............................................... H03C 3/00
[52] U.S. Cl. ................................... 332/16 R; 375/122
[58] Field of Search ............... 332/9 R, 16 R; 328/13; 307/268, 540, 555; 455/10; 375/19, 42, 52, 55, 83, 94, 122

[56] References Cited

U.S. PATENT DOCUMENTS 3,913,093 10/1975 De Vincentiis et al. ..... 340/347 DD
4,567,602 1/1986 Kato et al. ..................... 332/16 R X

*Primary Examiner*—Eugene R. Laroche
*Assistant Examiner*—Robert J. Pascal
*Attorney, Agent, or Firm*—Sughrue, Mion, Zinn, Macpeak, and Seas

[57] ABSTRACT

A quadriphase phase modulation system having a serial to parallel converter for converting first symbols of two-bit serial data into second symbols of two-bit parallel data, a circuit for generating waveform information in response to the second symbols, a memory for storing basic waveforms and a connection waveform and for reading out basic and connecting waveforms in response to the received waveform information. The basic waveform information is selected on the basis of the present waveform information and the connecting waveform is selected on the basis of the present waveform information and the immediately preceding waveform information. A digital to analog converter converts the basic and connecting waveforms output by the memory means into an analog signal.

4 Claims, 7 Drawing Sheets

WAVEFORM NUMBER  BASIC WAVEFORM

| 4-BIT PATTERN | CONNECTION WAVEFORM NUMBER | BASIC WAVEFORM NUMBER |
|---|---|---|
| 0 0 0 0 | 0 | A |
| 0 0 0 1 | 1 | F |
| 0 0 1 0 | 2 | 0 |
| 0 0 1 1 | 3 | 5 |
| 0 1 0 0 | 4 | A |
| 0 1 0 1 | 5 | F |
| 0 1 1 0 | 6 | 0 |
| 0 1 1 1 | 7 | 5 |
| 1 0 0 0 | 8 | A |
| 1 0 0 1 | 9 | F |
| 1 0 1 0 | A | 0 |
| 1 0 1 1 | B | 5 |
| 1 1 0 0 | C | A |
| 1 1 0 1 | D | F |
| 1 1 1 0 | E | 0 |
| 1 1 1 1 | F | 5 |

QUADRIPHASE PHASE MODULATION SYSTEM

BACKGROUND OF THE INVENTION

The present invention relates to a phase modulation system, and more particularly to a phase modulation system suitable for subscriber transmission.

In base band digital transmission by way of a metallic medium, codes that can be regarded as phase modulation signals, such as the biphase codes (also known as the Walsh codes), are used by the prior art. Such phase modulation codes include quadriphase phase modulation (QPh) codes, which are also called the complex Walsh codes.

The QPh codes, however, have a wide transmission signal band because of their use of square waves and consequently cause considerable obstruction of other systems in crosstalk. Therefore, by the prior art the square waveform is band-limited with a high-order low-pass filter, which thus complicates the circuitry and thereby creates a new problem.

SUMMARY OF THE INVENTION

An object of the present invention, therefore, is to provide a quadriphase phase modulation system capable of generating phase modulation signals which are narrow in bandwidth without having to use the aforementioned filter for the band-limiting purpose.

A quadriphase phase modulation system according to the present invention comprises a serial to parallel (S/P) converter means for converting serial input data into one-symbol two-bit parallel data; a means for generating waveform information corresponding to a bit pattern created by the current symbol of the S/P converter means and a symbol prior to this current symbol; memory means for storing a first waveform determined by the current symbol and the symbol prior to the current symbol and a second waveform determined by the current symbol, and for supplying the waveform corresponding to the current symbol in response to the waveform information; and a digital to analog converter for converting signals from this memory means into analog signals.

BRIEF DESCRIPTION OF THE DRAWINGS

The above and other objects, features and advantages of the present invention will become apparent from the following detailed description when taken with the accompanying drawings in which.

DESCRIPTION OF PREFERRED EMBODIMENTS

Figure 1:
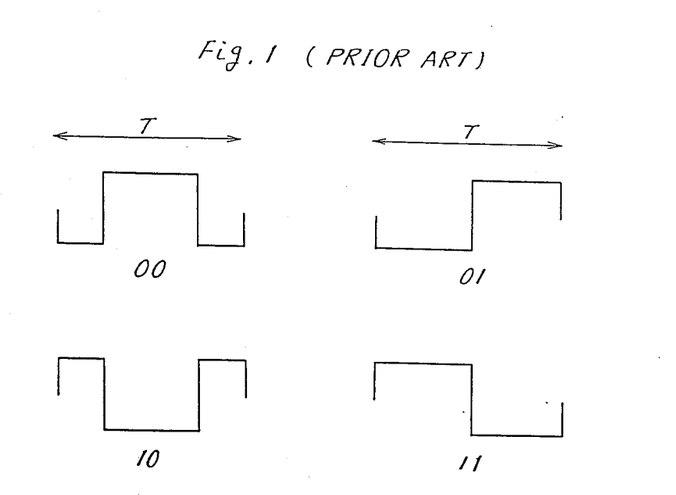
FIG. 1 is a diagram illustrating a quadriphase phase (QPh) modulation waveform of a square wave by the prior art.

To ensure better understanding of the present invention, the conventional QPh code will be described first with reference to FIG. 1. Supposing that the bit rate of a binary code (0 or 1) to be transmitted is 2 $f_0$ (bits/s) and two bits each (whose combination may be 00, 01, 10 or 11) of this code sequence is one symbol, the symbol can take one of four values. One waveform or another in a time T seconds ($=1/f_0$) is assigned to each of the four values as shown in FIG. 1, and sent out on a transmission line. In this case, the waveform is square, and the modulation speed is $f_0$ (baud).

As stated above, however, such a QPh code has a wide signal bandwidth because of its use of square waves, and the use of a band-limiting filter to narrow the bandwidth would entail the problem of complicating the hardware.

Figure 2:
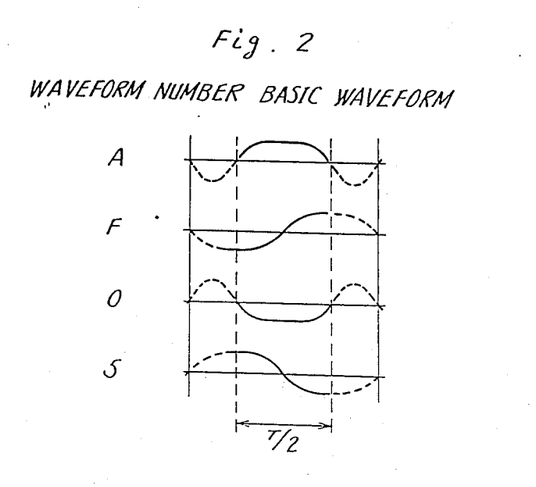
FIGS. 2 and 3 are diagrams illustrating QPh modulation waveforms for use in the invention.
Figure 3:
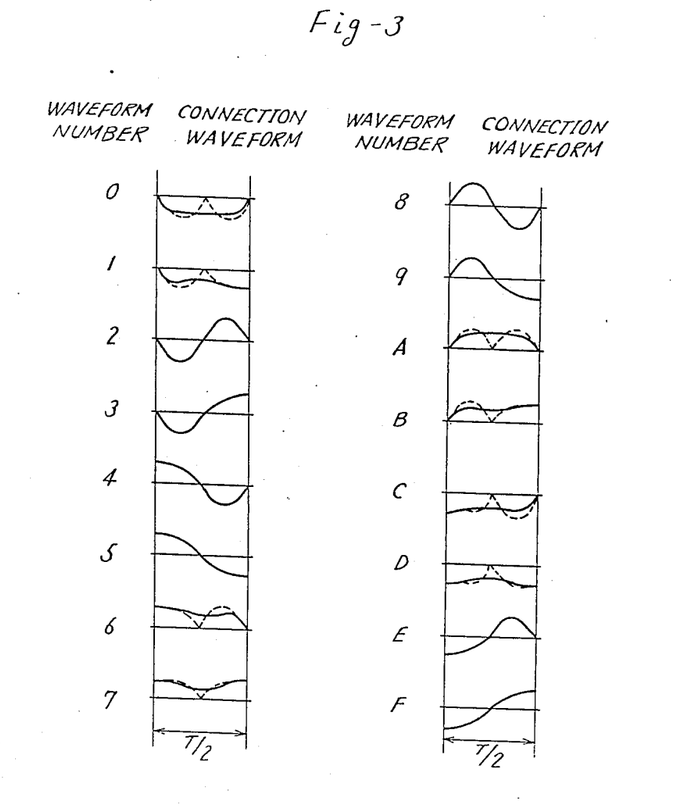

FIGS. 2 and 3 illustrate waveforms for use in a QPh modulation system of the invention cleared of the aforementioned disadvantage. The process of providing such waveforms will be described first.

Figure 4:
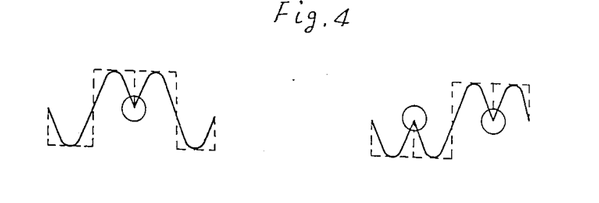
FIGS. 4 to 7 and FIGS. 8A to 8C are diagrams for describing the processes to obtain the waveforms for use in the invention.

Each of the conventionally used square waves of FIG. 1 is divided into a first to fourth parts on the time axis, and each part of the square wave is transformed into a sine wave as shown in FIG. 4. To simplify the illustration, only waveforms of "00" and "01" are transformed into sine waves.

Figure 5:
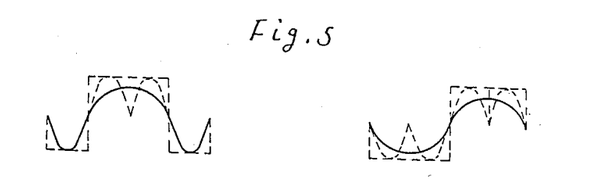

Referring to FIG. 4 wherein the transformed waves are shown, even though sine waves are used, phase discontinuities emerge at the points marked with a circle in the drawing. Since such phase discontinuities eventually obstruct the narrowing of the signal bandwidth, further transformation of the waves is required. One of the conceivable ways of transformation is to reduce "two peaks" in each sine wave into "one peak" as illustrated in FIG. 5. In doing so, the differential coefficients of the first and second parts, the third and fourth parts, or the second and third parts are equal to each other at the connection point of the two parts. Also, the area of the former half wave is the same as that of the latter half wave to maintain the D.C. equilibrium.

Figure 6:
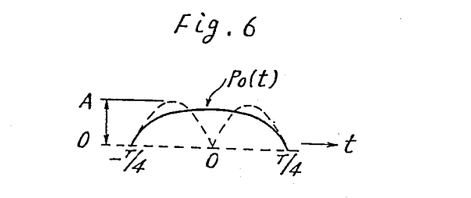

As an example of such a waveform, one represented by the following fourth order function, illustrated in FIG. 6, can be used.

$$P_0(t) = A\left\{ a + b\left(\frac{t}{T/4}\right)^2 + c\left(\frac{t}{T/4}\right)^4 \right\} |t| \leq \frac{T}{4}$$

$$a = \frac{15}{4\pi} - \frac{\pi}{8}, b = -2a + \frac{\pi}{2}, c = a - \frac{\pi}{2}$$

Here the original sine wave is represented by:

$$A\left| \sin \frac{\pi 4}{T/4} \right| |t| \leq \frac{T}{4}$$

Figure 7:
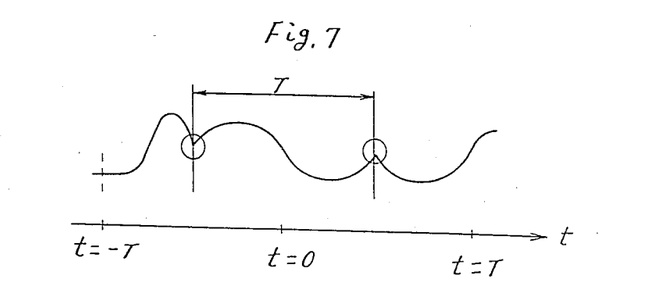
Figure 8A:
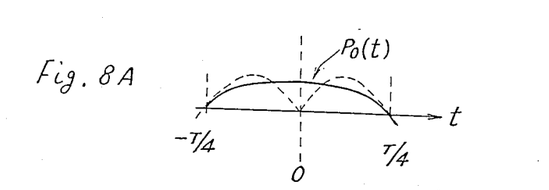
Figure 8B:
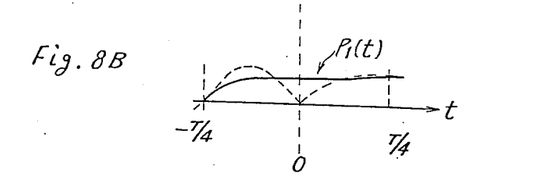
Figure 8C:
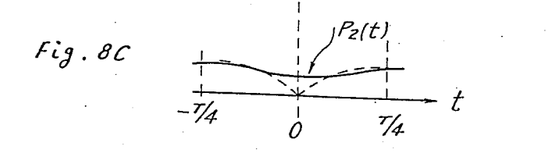

Even if the square waves of FIG. 1 are transformed into the shapes illustrated in FIG. 5, there will still emerge phase discontinuities between adjoining symbols. FIG. 7 shows how phase discontinuities occur between symbols at the points marked with a circle. Examination of the 16 ($2^4$) kinds of waveforms made by pairs of adjoining symbols reveals that phase discontinuities occur in eight combinations, identified by waveform numbers 0, 1, 6, 7, A, B, C and D of FIG. 3. The waveforms of FIG. 3 represent only the T/4 portions in the connections between adjoining symbols, and the waveform numbers are expressed sexadecimally. These eight kinds of phase discontinuity can be classified into three types as illustrated in FIGS. 8A to 8C. Thus, out of two adjoining symbols, the waveform from time 0 to time T/4 of the current symbol being regarded as a first connection waveform and that from time 0 to time −T/4 of the immediately preceding symbol, as a second connection waveform, both the first and second connection waveforms (dotted lines) shown in FIG. 8A are sinusoids. Further, in the waveform shown in FIG. 8B, the second connection waveform is a sinusoid, while the first is the former half of a sinusoid, and in the waveform shown in FIG. 8C, the first connection waveform is the former half of a sinusoid while the second is the latter half of a sinusoid.

These waveforms of FIGS. 8A to 8C are transformed for phase-continuous connection of their respective first and second connection waveforms. These wave transformations are achieved by, making the waveforms continuous at $t = \pm T/4$, within the range of $|t| \leq T/4$ in the figures, making the differential coefficients identical at $t = \pm T/4$ and making the areas of the waveform of $-T/4 \leq t \leq 0$ and that of $0 \leq t \leq T/4$ equal (for D.C. balancing). The waveforms obtained by such transformations are represented by solid lines in FIGS. 8A to 8C. The transformed waveform of FIG. 8A is expressed in an equation of the fourth order coinciding with the aforementioned waveform $P_0(t)$. That of FIG. 8B is represented by $$P_1(t) = 0.646891 - 0.184676\left(\frac{4t}{T}\right) + 0.292579\left(\frac{4t}{T}\right)^2 + 0.585157\left(\frac{4t}{T}\right)^3 - 0.538988\left(\frac{4t}{T}\right)^4$$

and that of FIG. 8C by $$P_2(t) = 0.482818 + 0.616287\left(\frac{4t}{T}\right)^2 - 0.318144\left(\frac{4t}{T}\right)^4$$

In this manner waveforms for smoothly connecting two consecutive symbols (hereinafter called connection waveforms) are obtained.

Figure 9:
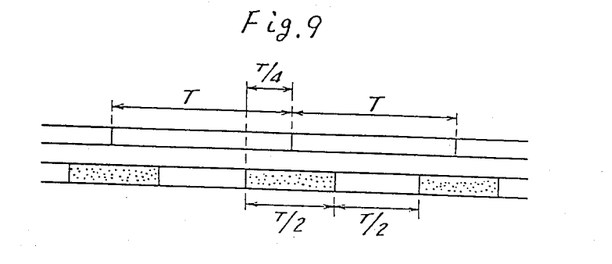
FIG. 9 is a diagram illustrating the connective relationship of waveforms for use in the invention.

Meanwhile, the other parts (blank parts) of the waveform shown in FIG. 9, between the connective parts (dotted parts) are determined by the peculiar value of each symbol. It is evident from the waveforms illustrated in FIG. 1 that these waveforms constitute those shown in FIG. 2. The waveforms of FIG. 2 are hereinafter considered the basic waveforms. Therefore, consecutive symbols can be represented by the four basic symbols (FIG. 2) determined by an individual symbol and 16 connection waveforms determined by pairs of consecutive symbols.

Figure 10:
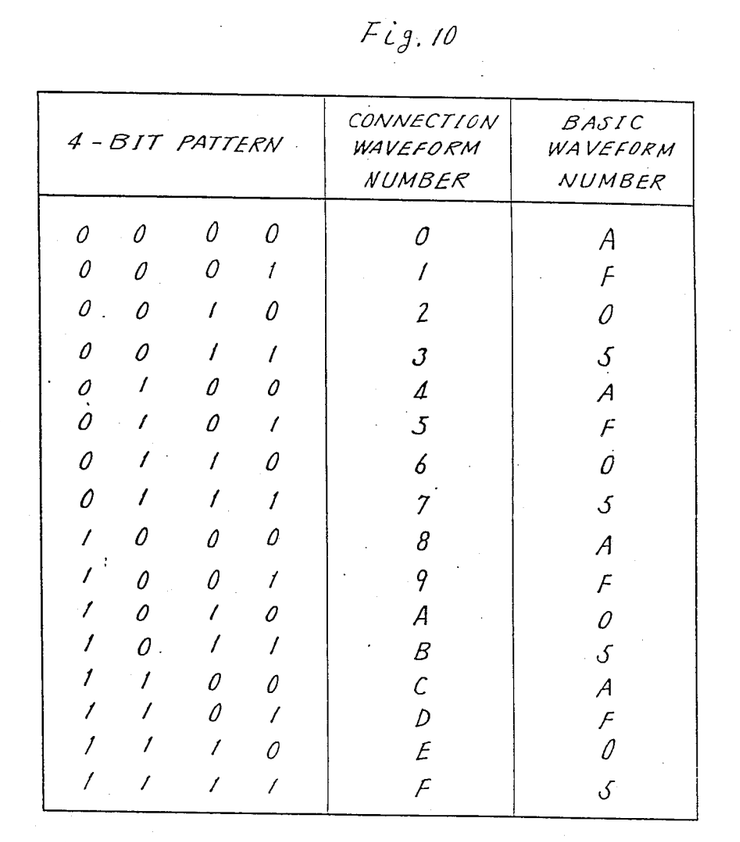
FIG. 10 is a table illustrating the relationship between bit patterns and waveforms.

FIG. 10 is a table listing the combinations of a basic waveform and a connection waveform determined by two consecutive symbols. Referring to FIG. 10, when the first and second symbols are "00" and "00" for instance, these two symbols are composed of the connection waveform of sexadecimal 0 and the basic waveform of sexadecimal A. Next, when symbol "01" is entered following "00" as third symbol, "00" and "01", according to this table, consist of the connection waveform of sexadecimal 1 and the basic waveform of sexadecimal F.

Figure 11:
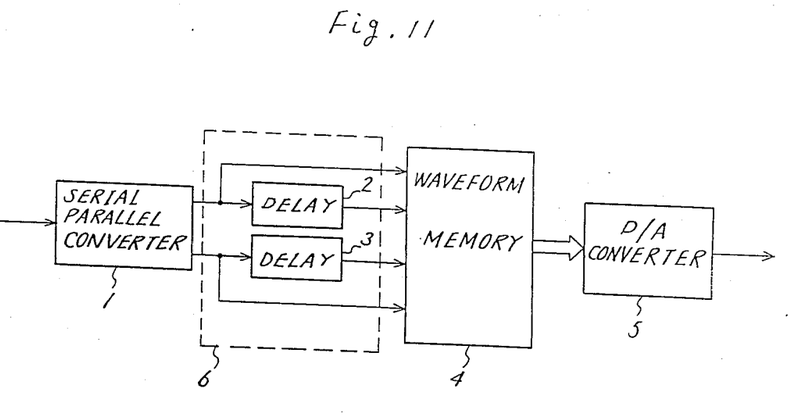
FIGS. 11 and 12 are block diagrams illustrating first and second embodiments of the invention.

FIG. 11 is a block diagram illustrating a first embodiment of the present invention for generating the aforementioned waveforms. Referring to FIG. 11, a serial to parallel (S/P) converter 1 converts two-bit series data 11 into two-bit parallel data 12. The parallel data constitute symbols. A waveform information generator 6 generates information for converting symbols into waveforms in response to the parallel data. The generator 6 consists of delay circuits 2 and 3, further comprising flipflops which delay the parallel data by one symbol period, and signal lines which directly output the parallel data from the S/P converter 1. The delayed and undelayed parallel data constitute the four-bit patterns of FIG. 10, and are supplied as addresses to a ROM 4. The ROM 4 stores 16 waveforms, each consisting of a connecting waveform and a basic waveform corresponding to the outputs listed in FIG. 10, as digital values obtained by sampling these waveforms. The ROM 4 outputs one of the waveform data in response to an address of a four-bit pattern. A D/A converter 5 converts digital waveforms into analog waveforms.

Figure 12:
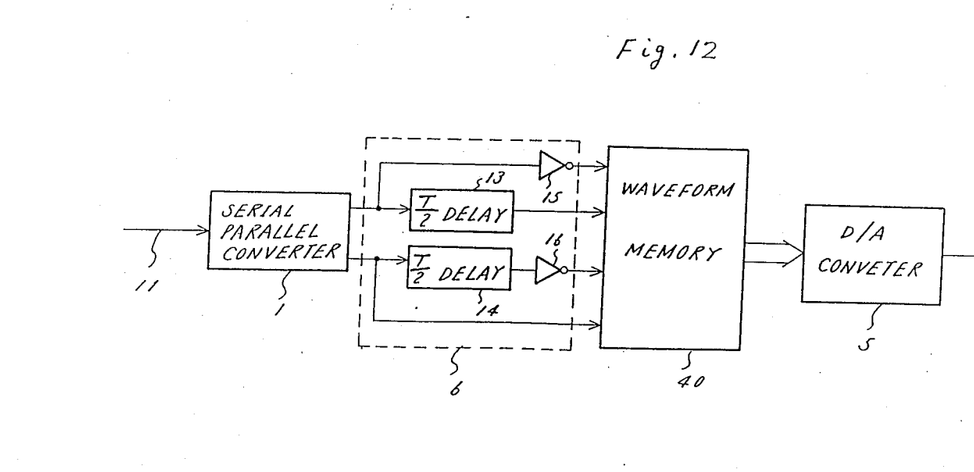

FIG. 12 shows a block diagram of a second embodiment of the present invention. In the first embodiment of FIG. 11, the memory 4 requires a larger memory capacity because its stores 16 waveforms each of which are generated during T seconds and consists of a basic waveform and a connection waveform. The second embodiment reduces the memory capacity by using a memory 40 to store only 16 connection waveforms each of which is generated during T/2 seconds and to generate both the connection and basic waveforms. The waveform information generator 6 comprises two half-symbol delay circuits 13 and 14 and inverters 15 and 16.

The inverters 15 and 16 are used to produce exact addresses for basic waveforms.

More specifically, the memory 40 requires addresses "1010", "1111", "0000" and "0101" to produce the basic waveform numbers A, F, 0 and 5 shown in FIG. 2 by using the connection waveforms as shown in FIG. 10.

However, when the basic waveforms of the symbols "00", "01", "10" and "11" are generated, since the input symbol is the same as the T/2-delayed symbol as shown in FIG. 9, wrong addresses "0000", "0101", "1010" and "1111" are produced for the symbols "00", "01", "10" and "11", respectively. The comparison of the wrong address with the correct address, for example, "1010" with "0000" shows that the first and third digits are different from each other. Therefore, the inverters 15 and 16 are necessary to invert the first and third digits to produce a correct address when the basic waveforms are generated. The memory 40 alternately produces the basic and connection waveforms in response to the addresses supplied from the generator 6.

Figure 13:
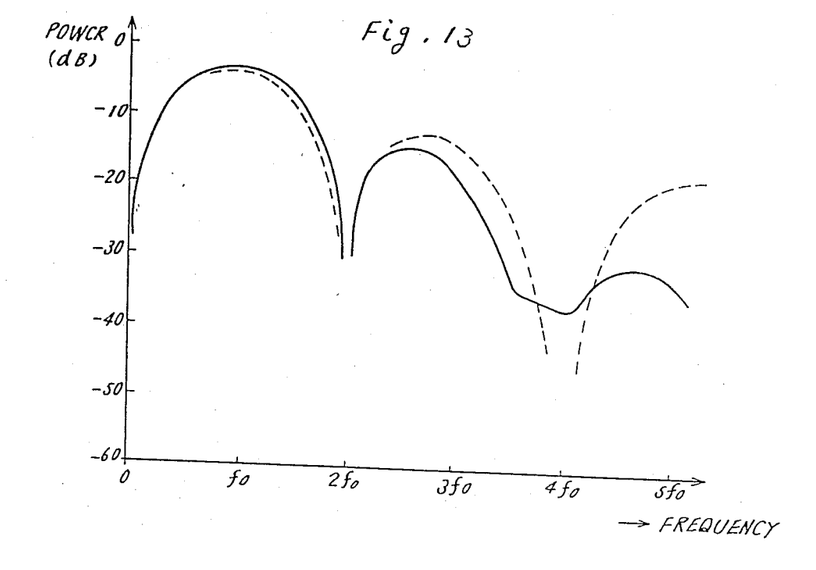
FIG. 13 is a diagram illustrating the power spectra of a waveform for use in the invention and a waveform of the prior art.

FIG. 13 is a diagram which explains how the aforementioned modulated signals are narrowed in bandwidth, wherein the theoretical values of the power spectra of the conventional QPh code (or the complex Welsh code) and the code generated according to the present invention are shown together. The solid lines represent the characteristic of the present invention and the dotted lines, that of the prior art. As is evident from the characteristics, the power spectrum of the code of the present invention are significantly suppressed in a frequency range of above 2 $f_0$, especially above 4 $f_0$.

As hitherto described, the present invention can virtually dispense with a low-pass filter (of a high order) for the band-limiting purpose on the transmitting side, and accordingly has the advantage of permitting substantial simplification of the circuitry composed for digital processing.

What is claimed is:

1. A quadriphase phase modulation system, comprising:

serial to parallel converter means for converting first symbols, each comprised of two-bit serial data, into second symbols comprised of two-bit parallel data;

means for generating waveform information in response to said second symbols;

memory means for storing basic waveforms and connecting waveforms, said connecting waveforms being designed to smooth connections between and eliminate phase discontinuity at junctions of adjoining symbols, and for reading out said basic waveforms and said connecting waveforms in response to said waveform information, each said basic waveform being selected on the basis of the most recently generated waveform information, and said connecting waveform being selected on the basis of said most recently generated waveform information and the immediately preceding waveform information; and a digital to analog converter means for converting the basic and connecting waveforms output by said memory means into analog signals.

2. A quadriphase phase modulation system as claimed in claim 1, wherein said waveform information generating means comprises means for dividing said second symbols into first through fourth subsections, and for converting said subsections into sine wave information.

3. A quadriphase phase modulation system as claimed in claim 2, wherein said memory means stores a plurality of connecting waveforms and basic waveforms, and upon being addressed by said sine wave information, reads out a combination of one of said basic waveforms and one of said connecting waveforms selected so that said converted subsections become continuous and identical in differential coefficient and have identical DC components.

4. A quadriphase phase modulation system, comprising:

serial to parallel converter means for converting first symbols, each comprised of two-bit serial data, into second symbols, comprised of two-bit parallel data;

means for generating waveform information in response to said second symbols;

memory means for storing said basic waveforms and connecting waveforms and for reading out said basic waveforms and said connecting waveforms in response to said waveform information, each said basic waveform being selected on the basis of the most recently generated waveform information, and said connecting waveform being selected on the basis of said most recently generated waveform information and the immediately proceeding waveform information; and digital to analog converter means for converting the basic and connecting waveforms output by said memory means into analog signals;

said waveform information generating means comprising means for dividing said second symbols into first through fourth subsections, and for converting said subsections into sine wave information;

said memory means storing a plurality of connecting waveforms and basic waveforms, and, upon being addressed by said sine wave information, reading out a combination of one of said basic waveforms and one of said connecting waveforms selected so that said converted subsections become continuous and identical in differential coefficient and have identical DC components;

said sine wave information used to address said memory comprising a four-bit pattern, two of said bits being derived from said second and third converted subsections of said most recently generated waveform information, and two of said bits being derived from said first converted subsection of said most recently generated waveform information and said fourth converted subsection of said immediately preceding waveform information.

* * * * *

UNITED STATES PATENT AND TRADEMARK OFFICE
CERTIFICATE OF CORRECTION

PATENT NO. : 4,786,882
DATED : November 22, 1988
INVENTOR(S) : KOIKE

It is certified that error appears in the above-identified patent and that said Letters Patent is hereby corrected as shown below:

Column 1, line 19, delete "by" and insert --in--.
Column 2, lines 56-60, delete
"$A \left| \sin \frac{\pi 4}{T/4} \right|$" and insert --$A \left| \sin \frac{\pi t}{T/4} \right|$--.

Signed and Sealed this

Third Day of October, 1989

Attest:

DONALD J. QUIGG

Attesting Officer

Commissioner of Patents and Trademarks